United States Patent
Park

(10) Patent No.: US 10,286,393 B2
(45) Date of Patent: May 14, 2019

(54) REGENERATION CATALYST FOR HYDROTREATING HEAVY OIL OR RESIDUE AND PREPARATION METHOD THEREOF

(71) Applicant: HANSEO UNIVERSITY ACADEMIC COOPERATION FOUNDATION, Seosan-si, Chungcheongnam-do (KR)

(72) Inventor: Hea Kyung Park, Seoul (KR)

(73) Assignee: HANSEO UNIVERSITY ACADEMIC COOPERATION FOUNDATION, Seosan-si (KR)

(*) Notice: Subject to any disclaimer, the term of this patent is extended or adjusted under 35 U.S.C. 154(b) by 0 days.

(21) Appl. No.: 15/849,845

(22) Filed: Dec. 21, 2017

(65) Prior Publication Data

US 2018/0178209 A1 Jun. 28, 2018

(30) Foreign Application Priority Data

Dec. 26, 2016 (KR) .................. 10-2016-0178955

(51) Int. Cl.
*B01J 38/62* (2006.01)
*B01J 21/04* (2006.01)
(Continued)

(52) U.S. Cl.
CPC .............. *B01J 38/60* (2013.01); *B01J 38/02* (2013.01); *C10G 47/16* (2013.01); *C01B 33/12* (2013.01);
(Continued)

(58) Field of Classification Search
CPC ... B01J 38/60; B01J 38/62; B01J 38/02; B01J 21/04; B01J 21/066; B01J 21/08;
(Continued)

(56) References Cited

U.S. PATENT DOCUMENTS 3,020,239 A * 2/1962 Flinn ....................... B01J 23/28
502/28
4,595,666 A * 6/1986 Ganguli ................... B01J 23/94
502/26
(Continued)

FOREIGN PATENT DOCUMENTS

KR 10-2012-0030758 A 3/2012
KR 10-2012-0124047 A 11/2012
(Continued)

OTHER PUBLICATIONS

Korean Intellectual Property Office, Communication dated Jan. 12, 2018, issued in corresponding Korean Application No. 10-2016-0178955.

*Primary Examiner* — Patricia L. Hailey
(74) *Attorney, Agent, or Firm* — Sughrue Mion, PLLC

(57) ABSTRACT

The present disclosure relates to a regenerated catalyst for hydrotreating heavy oil or residue oil and a preparation method thereof. More particularly, the present disclosure relates to the regenerated catalyst having excellent mechanical properties and desulfurization performance with minimal loss of active components and the method for preparing the regenerated catalyst. The regenerated catalyst can be used in place of the fresh catalyst, is excellent in economy and can reduce the environmental burden by reusing the spent catalyst to be disposed or buried.

12 Claims, 2 Drawing Sheets

(51) Int. Cl.
  *B01J 21/08* (2006.01)
  *B01J 21/18* (2006.01)
  *B01J 23/22* (2006.01)
  *B01J 23/28* (2006.01)
  *B01J 23/30* (2006.01)
  *B01J 23/75* (2006.01)
  *B01J 23/755* (2006.01)
  *B01J 23/882* (2006.01)
  *B01J 23/883* (2006.01)
  *B01J 23/888* (2006.01)
  *B01J 23/92* (2006.01)
  *B01J 23/94* (2006.01)
  *B01J 38/60* (2006.01)
  *B01J 38/02* (2006.01)
  *C10G 47/16* (2006.01)
  *C01B 33/12* (2006.01)
  *C01F 7/02* (2006.01)
  *C01G 25/02* (2006.01)

(52) U.S. Cl.
  CPC ............ *C01F 7/02* (2013.01); *C01G 25/02* (2013.01); *C10G 2300/202* (2013.01); *C10G 2300/207* (2013.01); *C10G 2400/16* (2013.01); *Y02P 20/584* (2015.11)

(58) Field of Classification Search
  CPC ... B01J 21/18; B01J 23/22; B01J 23/28; B01J 23/30; B01J 23/75; B01J 23/755; B01J 23/8472; B01J 23/882; B01J 23/883; B01J 23/8877; B01J 23/888; B01J 23/8885; B01J 23/92; B01J 23/94
  USPC .......... 502/27, 28, 247, 248, 255, 259, 260, 502/312–313
  See application file for complete search history.

(56) References Cited

U.S. PATENT DOCUMENTS

| 4,698,321 | A | * | 10/1987 | Myerson | B01J 21/20 208/216 R |
| 5,906,953 | A | * | 5/1999 | Duddy | B01J 38/48 502/27 |
| 9,457,343 | B2 | | 10/2016 | Park | |
| 2014/0076781 | A1 | | 3/2014 | Park | |

FOREIGN PATENT DOCUMENTS

| KR | 10-1366697 B1 | 2/2014 |
| KR | 10-1430408 B1 | 8/2014 |
| KR | 10-1434437 B1 | 8/2014 |
| KR | 10-1458817 B1 | 11/2014 |
| WO | 99/61557 A1 | 12/1999 |
| WO | 2012/150816 A2 | 11/2012 |

* cited by examiner

REGENERATION CATALYST FOR HYDROTREATING HEAVY OIL OR RESIDUE AND PREPARATION METHOD THEREOF

CROSS-REFERENCE TO RELATED APPLICATION

This application claims under 35 U.S.C. § 119(a) the benefit of Korean Patent Application No. 10-2016-0178955 filed on Dec. 26, 2016, the entire contents of which are incorporated herein by reference.

BACKGROUND

(a) Technical Field

The present invention relates to a regenerated catalyst with improved desulfurization performance and mechanical strength for heavy oil desulfurization and a preparation method thereof.

(b) Background Art

Crude oil passes through a crude distillation unit (CDU) and is separated into petroleum gas, light oil, heavy oil and residue oil through several stages of refining process. The petroleum gas produces LPG product, the light oil produces gasoline, naphtha, jet fuel, kerosene and gas oil products, the heavy oil produces products such as Bunker A, Bunker B and Bunker C, the residue oil is once more refined and then used, or produces asphalt, petroleum coke and the like.

Particularly, since the heavy oil and residue oil contain a large amount of heavy metals such as vanadium and nickel and sulfur in the oil, a hydro-demetallation and desulfurization processes must be necessarily performed in order to produce the products.

The catalysts used for demetallation and desulfurization processes are mainly composed of cobalt(Co)-molybdenum (Mo) and nickel(Ni)-molybdenum(Mo) based active component supported by catalyst support such as $Al_2O_3$, and are different in physical properties such as content, pore volume and specific surface area of the catalyst.

The spent catalysts discharged from the demetallation process have a high deposition amount of vanadium, so that the pellet-type catalysts are severely entangled with each other. And thus the regeneration is limited due to the difficulty of discharging out of the reactor while maintaining their original shape after the end of their life, and therefore, most of them are pulverized and discarded after recovery of valuable metal.

Meanwhile, in the case of the desulfurization catalysts, as the amount of deposited metals is relatively lower than demetallation catalysts, it is possible to unload out of the reactor with maintaining their original shape.

Accordingly, it is imperative to propose a method for reusing the spent catalysts used in the heavy oil desulfurization process.

Therefore, various methods of regeneration of the spent catalysts have been suggested.

As an example, International Patent Publication No. WO1999/061557 discloses a method of regenerating the catalysts after use through a process of washing the catalysts with a solvent and then removing the carbonaceous material by heat treatment at 200 to 800° C. and also provides a method for carrying out a desulfurization process by passing heavy oil through fixed bed reactor filled with the regenerated catalysts through this method. However, with this heat treatment alone, only the deposited carbonaceous material and sulfur are removed by the oxidation reaction, and the deposited vanadium is not removed and still block the mouth of the micropores of the catalyst. Thus, desulfurization performance may be temporarily restored, but there is a problem that it is highly likely that the desulfurization performance of the regenerated catalysts cannot be sustained for a long time corresponding to the lifetime of the fresh catalysts.

Thus, Korean Patent No. 10-1434437 suggests a method for regenerating the spent catalysts by treating the spent catalysts by water treatment, followed by subjecting it to heat treatment at the high temperature of 400° C. to 550° C. to remove sulfur and carbonaceous materials, and removing vanadium by using a solvent. The regenerated catalysts regenerated by this method have an advantage that the deposited vanadium component is completely removed, but at the same time, there is a problem that a significant amount of the molybdenum and nickel components, which are the active component, is simultaneously leached out and lost. As a result, the regenerated catalysts regenerated by the above method cannot exhibit sufficient catalytic activity, and thus, their reuse in the actual desulfurization process, is only at the level of mixed use with the fresh catalyst.

In particular, the amount of desulfurization catalyst used in desulfurization process of heavy oil is rapidly increasing worldwide in conjunction with new extension of the facilities for heavy oil upgrading process, not only in Korea, but also in developed countries. At present, Korea is dependent on imports of all of these catalysts, and in view of this situation, a regenerating method of the spent catalysts is required which enables the activity of the catalyst to be exerted at the level of a fresh catalyst.

In view of the above demands, the present inventors have conducted various studies for regeneration of the spent catalysts, and have proposed regenerating methods of the spent catalysts used in the desulfurization process of heavy oil and residue oil through Korean Patent No. 10-1430408, No. 10-1458817 and No. 10-1366697.

In these patents, a method for obtaining the regenerated catalysts by washing the spent catalysts with an organic solvent, followed by heat treatment, and then performing acid treatment using an aqueous acid solution has been proposed. The regenerated catalysts prepared by the above method had a low level of vanadium and exhibited almost equivalent desulfurization performance as compared to the fresh catalysts.

However, despite the excellent desulfurization performance of the regenerated catalysts, the mechanical strength of the regenerated catalysts was about 95% or less of that of the fresh catalysts, and thus since the regenerated catalysts cause pressure drop when filled in a large amount in the actual reactor and used, the regenerated catalysts were problematic to completely replace the fresh catalysts.

That is, in the case of the regenerated catalysts proposed in the above patent, the heat treatment was performed for 1 hour to 3 hours at the temperature of from 450 to 550° C. in order to completely oxidize and remove the carbonaceous material. When the heat treatment is performed under the high temperature condition in a state where the content of the deposited vanadium is relatively high like this, the vanadium acts as a catalyst for oxidation and thus $Al_2O_3$, which is the catalyst support, is lost. As a result, there is a high possibility that the mechanical strength of the catalysts is lowered, and also, since the heat of oxidation reaction is accumulated in the pores of the catalysts, molybdenum and nickel, which are active components, are coagulated with each other, and thus there is a possibility that the desulfurization performance is lowered due to the loss of active sites.

Therefore, in order to more completely replace the fresh catalysts, there is an urgent need for the regenerated catalysts having a mechanical strength as well as a desulfurization performance superior to that of the prior art, and a process for regenerating the catalysts.

PRIOR ART LITERATURE

Patent Literature

Korean Patent No. 10-1434437 (Aug. 20, 2014), INTEGRATED CLEANING DEVICE AND METHOD OF USED-CATALYST FOR RESIDUAL HYDRO DESULFURIZATION (RHDS) AND VACUUM RESIDUE HYDRODESULFURIZATION (VRHDS)

International Patent Publication No. WO1999/061557 (Dec. 2, 1999), HYDROTREATING PROCESS FOR RESIDUAL OIL Korean Patent No. 10-1430408 (Aug. 8, 2014), METHOD FOR HYDORTREATING OF HEAVY RESIDUE BY USING REGENERATED OR REMANUFACTURED CATALYST Korean Patent No. 10-1458817 (Oct. 31, 2014), METHOD FOR PREPARING REGENERATED OR REMANUFACTURED CATALYST FOR HYDORTREATING OF HEAVY RESIDUE Korean Patent No. 10-1366697 (Feb. 18, 2014), REGENERATED OR REMANUFACTURED CATALYST FOR HYDORTREATING OF HEAVY RESIDUE The above information disclosed in this Background section is only for enhancement of understanding of the background of the invention and therefore it may contain information that does not form the prior art that is already known in this country to a person of ordinary skill in the art.

SUMMARY OF THE DISCLOSURE

Accordingly, inventors of the present invention conducted the processes in the order of first low temperature heat treatment, an acid treatment and second high temperature heat treatment by dividing the existing heat treatment process in the regenerating process of spent catalysts used for heavy oil desulfurization into two stages, and thus confirmed that the loss of the active components of the catalysts is minimized, and at the same time, the deposited carbonaceous material and vanadium can be removed to a maximum, and the regenerated catalysts has excellent desulfurization performance and mechanical strength, thereby completing the present invention.

It is an object of the present disclosure to provide a regenerated catalyst by regenerating a spent catalyst, which can be used in the process of hydrogenating heavy oil or residue oil and has improved performance compared to conventional regenerated catalysts.

Also, another object of the present disclosure is to provide a preparation method of a regenerated catalyst which can be used in the hydrogenating process of heavy oil or residue oil.

In order to achieve the above object, the present disclosure provides a regenerated catalyst for a heavy oil or residue oil hydrogenation process by regenerating a spent catalyst having an active component supported by a catalyst support, wherein the regenerated catalyst has a vanadium oxide content of 1.0% by weight or less as measured by fluorescent X-ray analysis.

The regenerated catalyst may have a compressive strength of 97% or more as compared to a fresh catalyst and a desulfurization performance of 98% or more as compared to the fresh catalyst.

In addition, the present disclosure provides a method of preparing the regenerated catalyst for the heavy oil or residue oil hydrogenation process, which comprises of a low temperature heat treatment process of first heat-treating a spent catalyst at a low temperature;

an acid treatment process of treating the low temperature heat-treated spent catalyst with an acid solution; and a high temperature heat treatment process of second heat-treating the acid-treated spent catalyst at a high temperature.

The low temperature heat treatment may be performed at a temperature of from 220 to 300° C., and the high temperature heat treatment may be performed at a temperature of from 400 to 600° C.

The method may be further performed a solvent washing process of washing the spent catalyst before the low temperature heat treatment process and a water washing process of washing the acid-treated spent catalyst before the high temperature heat treatment process.

The acid treatment solution may include at least one selected from the group consisting of oxalic acid, citric acid, succinic acid, sulfuric acid and nitric acid.

The regenerated catalyst according to the present disclosure minimizes the loss of the active component of the catalyst and maintains the mechanical strength at the equivalent level to that of a fresh catalyst. Therefore, the regenerated catalyst according to the present disclosure has the catalytic activity equivalent to that of the fresh catalyst in the hydrogenating process of heavy oil and residue oil, especially in the desulfurization process, and exhibits excellent catalytic activity as compared to the regenerated catalyst regenerated in the conventional process, thereby being usable as a complete replacement catalyst for the fresh catalyst.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
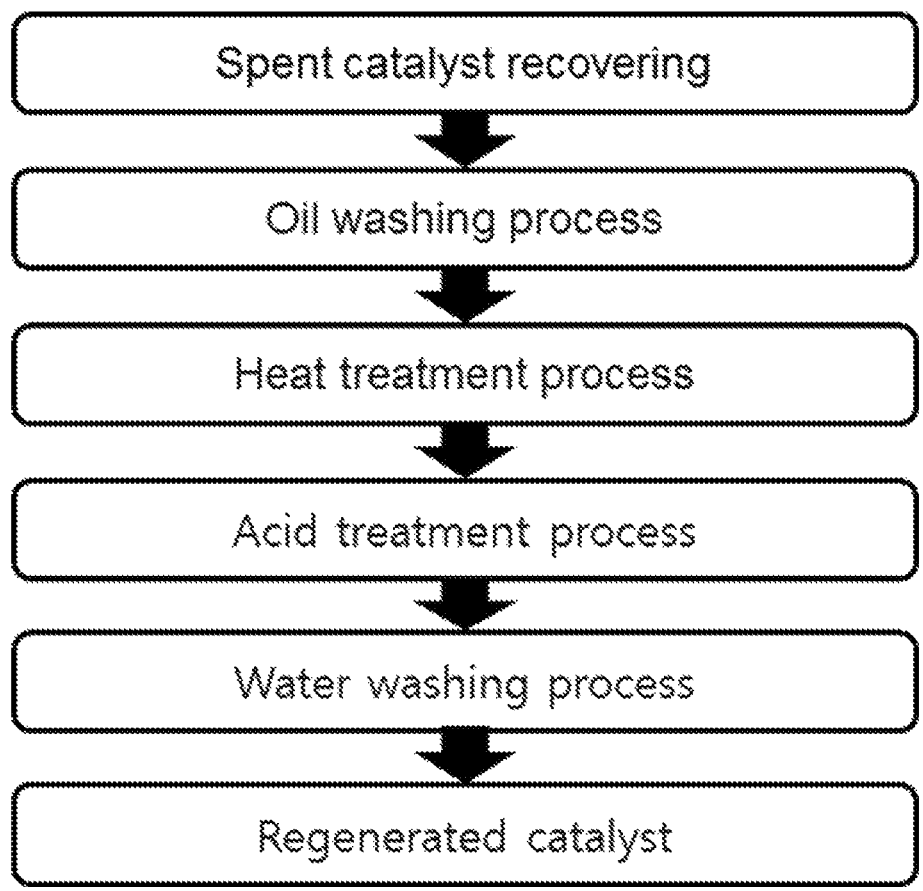
FIG. 1 is a flow chart showing the preparing steps of the regenerated catalyst according to the prior art.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The conventional regenerating process of the spent catalysts used for heavy oil desulfurization includes a heat treatment process to remove carbon and sulfur and an acid treatment process to remove vanadium. However, there was a problem that during these processes, the active component contained in the catalysts is lost, and thus the activity of the regenerated catalysts is greatly reduced. The present disclosure provides a regenerated catalyst which minimizes the amount of active component lost during the regenerating process, especially after the heat treatment and the acid treatment and which is capable of exhibiting mechanical strength (ex., compressive strength) and desulfurization performance above a certain level as catalysts that can be practically applied to the heavy oil hydrogenation process.

Hereinafter, various terms are used in the present disclosure in connection with the regenerated catalyst, and their definitions are as follows.

The term 'heavy oil' or 'residue oil' referred to herein in connection with petroleum products refers to oil including distillation residue components such as atmospheric distillation residues or vacuum distillation residues, and does not include oil consisting only of spilt oils such as kerosene, diesel oil, and vacuum gas oil.

As used herein, the terms 'fresh catalyst', 'spent catalyst', and 'regeneration catalyst' are used in connection with catalyst, and their definitions are as follows.

First, the term 'fresh catalyst' as used herein refers to a catalyst prepared for use in the hydrogenating process of heavy oil or residue oil. The fresh catalyst includes not only a catalyst that has never been used in the hydrogenating process, but also a catalyst that has been used for hydrogenation once, but is discontinued within a short period of time due to problems in the apparatus and used again as it is. That is, the fresh catalyst includes a catalyst that still has, even if used transiently, sufficient hydrogenating activity to be considered from the outset, without any special activation treatment.

The term "spent catalyst" as used herein refers to a catalyst which is resulted by using a fresh catalyst in the hydrogenating process of heavy oil, residue oil or the like, and thus cannot exhibit sufficient hydrogenating activity as it is.

The term 'regenerated catalyst' referred to herein refers to a catalyst produced by removing impurities from the spent catalyst and activating it by a regenerating process according to the present disclosure.

The spent catalyst, the fresh catalyst and the regenerated catalyst referred to herein are supported catalysts in the form of including an active component and a catalyst support for carrying the same.

An active component is a metal that substantially exhibits catalytic activity, and a transition metal can be used as the active component. As an example, the active component may be at least one selected from the group of consisting of at least one metal selected from the group consisting of molybdenum, tungsten, cobalt, and nickel, metal oxides thereof and mixtures thereof. Preferably the active component includes a combination of a main catalyst comprising molybdenum or tungsten and a co-catalyst comprising cobalt or nickel.

A catalyst support is for supporting the active component, and is also called a catalyst substrate or carrier. The catalyst support supports and disperses the active component to widen the surface area thereof, stabilize the catalyst and serves to lower the price of the catalyst.

The catalyst support that can be used may be at least one selected from the group consisting of activated carbon, zeolite, $Al_2O_3$, $SiO_2$ and $ZrO_2$, and more preferably $Al_2O_3$.

The regenerated catalyst according to the present disclosure minimizes the amount of the active component lost after the regenerating process, and thus is capable of exhibiting mechanical strength and desulfurization performance above a certain level as a catalyst that can be practically applied to the hydrogenating process. This effect is achieved by regenerating through the regeneration method by the method described below.

Specifically, the regenerating process of the spent catalyst according to the present disclosure may include sequentially performing first heat treatment process of heat-treating the spent catalyst at a low temperature, an acid treatment process of treating with an aqueous acid solution and second heat treatment process of heat-treating the acid-treated spent catalyst at a high temperature. In the conventional preparing process of the regenerated catalyst shown in FIG. 1, the high temperature heat treatment for carbon and sulfur removal is first performed, and then the acid treatment process is performed. In this method, since the high temperature heat treatment is first performed in a state where the content of the deposited vanadium is high, the vanadium acts as an oxidation catalyst. That is, the vanadium oxidizes sulfur dioxide generated by oxidation of the metal in the state of sulfur compound to accelerate production of sulfur trioxide, and sulfuric acid produced by reaction of these sulfur trioxide and water reacts with $Al_2O_3$, which is the catalyst support, to form $Al_2(SO_4)_3$. Therefore, there is a possibility of causing problems that the mechanical strength of the catalyst is likely to be lowered, the reaction heat due to the exothermic reaction cannot be also discharged to the outside of the micropores of the catalyst and is trapped inside the micropores, and thus the temperature is not easily controlled due to the rapid rise locally in temperature, and molybdenum and nickel which are active component are coagulated with each other, and thus the desulfurization performance is reduced due to the loss of active sites.

Hereinafter, the present disclosure will be described in more detail with reference to the drawing.

Figure 2:
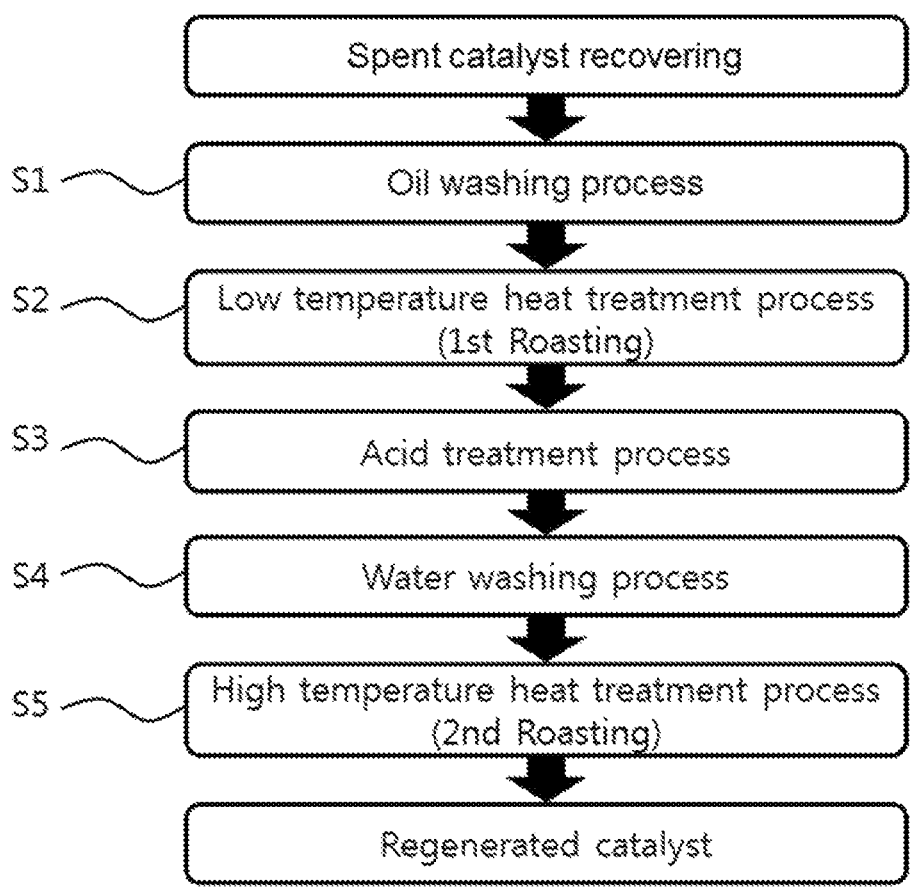
FIG. 2 is a flow chart showing the preparing steps of the regenerated catalyst according to the present disclosure.

FIG. 2 is a flow chart showing the preparing steps of the regenerated catalyst according to the present disclosure.

Referring to FIG. 2, the regenerated catalyst is prepared by performing (S1) solvent washing process of washing the spent catalyst with solvent to remove heavy oil or residue oil; (S2) first heat treatment process of heat-treating the washed catalyst at a low temperature to partially remove carbon and sulfur; (S3) an acid treatment process of contacting the first heat-treated spent catalyst with an aqueous acid solution to remove vanadium by leaching; (S4) a water washing process of washing the acid-treated spent catalyst with water and (S5) second heat treatment process of heat-treating the washed catalyst at a high temperature to completely remove carbon and sulfur.

(S1) Solvent Washing Process (Oil Washing)

First, the spent catalyst used in the hydrogenating process of heavy oil or residue oil may be recovered, and the washing process may be performed by using a solvent to remove heavy oil or residue oil contained in the spent catalyst.

The solvent for this step is not particularly limited in the present disclosure, and any solvent that can easily dissolve the conventional petroleum products can be used. As an example, the solvent may be at least one selected from the group consisting of aliphatic hydrocarbons, including pentane, hexane, heptane, isooctane and the like; alicyclic hydrocarbons such as cyclohexane; aromatic hydrocarbons such as benzene, toluene, xylene, styrene and the like; naphtha; kerosene and mixed solvents thereof. Preferably, heptane or kerosene corresponding to an aliphatic hydrocarbon which is less volatile and low in cost can be used.

In the present disclosure, the solvent washing process is not particularly limited in connection with its temperature, and can be performed at least once at room temperature and normal pressure. Preferably, the solvent washing process may be performed three times or more while heating to sufficiently remove heavy oil or residue oil, carried out by the method such as immersion or spraying depending on the apparatus and carried out in a batch process or a continuous process.

After the solvent washing process, drying may be performed to remove the residual solvent, and then the dried spent catalyst may be used in the next step. The drying temperature and period of time are not particularly limited and may vary depending on the type of solvent, and as an example, drying may be carried out from 60 to 180° C. for 1 hour to 24 hours.

(S2) Low Temperature Heat Treatment Process (1st Roasting)

Next, the washed spent catalyst may be recovered and the first low temperature heat treatment process may be performed.

The low temperature heat treatment process may be a process for partially removing carbon and sulfur deposited in the spent catalyst through heat treatment at a low temperature in order to avoid problems caused by heat-treating at a high temperature in the presence of a large amount of deposited vanadium.

The low temperature heat treatment may be performed at a temperature of from 220 to 300° C., preferably from 240 to 280° C. for 1 to 3 hours. When the heat treatment temperature and period of time are less than the above ranges, the removal of carbon and sulfur is insufficient, so that the vanadium leaching rate does not reach the target level in the next acid treatment step. On the contrary, when the heat treatment temperature and period of time exceed the above ranges, since the removal rate of carbon and sulfur is high and thus macro and micropores in the spent catalyst are largely opened, the leaching of the active component as well as deposited vanadium is likely to occur at the same time. Accordingly, it is important to adjust and control within the above ranges.

(S3) Acid Treatment Process (Acid Leaching)

Next, the acid treatment process for effectively removing the vanadium deposited in the spent catalyst without a large loss of the active component of the spent catalyst may be performed by contacting the low temperature heat-treated spent catalyst with an aqueous acid solution.

The deposited vanadium not only blocks the macro and micropores and the mouth of the pores in the spent catalyst but also is strongly adsorbed to surface of the metal, which is the active site, to lower the activity of the catalyst, and therefore, this clogging must be resolved through leaching by acid treatment.

The acid treatment solution may be applied in the form of an aqueous solution, and both organic acids and inorganic acids can be used. The organic acids may be at least one selected from the group consisting of oxalic acid, citric acid and succinic acid, and the inorganic acids may be at least one selected from the group consisting of sulfuric acid and nitric acid. Preferably, oxalic acid may be used to effectively remove the deposited vanadium.

The amount of acid used in the acid treatment process may be determined in consideration of the content of deposited vanadium, and it is preferable to use a molar ratio of vanadium to acid of from 1:1 to 1:2 based on the solid content. When the molar ratio is less than the above range, there is a problem that the leaching period of time becomes longer. On the contrary, when the molar ratio exceeds the above range, there is a problem that a treatment cost for unreacted acid may occur. Accordingly, the molar ratio can be appropriately adjusted within the above range.

Also, the concentration of the acid treatment solution may be adjusted to a concentration of from 5 to 25% by weight, and the process may be performed in a batch process or a continuous process at from 40 to 60° C. for 0.5 to 2 hours.

(S4) Water Washing Process (Water Washing)

Next, the acid-treated spent catalyst may be washed with water to remove the acid treatment solution remaining in the spent catalyst.

The water washing process is not particularly limited in connection with the temperature, and can be performed at least once at room temperature and normal pressure. The water washing process may be performed three times or more while heating to sufficiently remove the acid treatment solution, carried out by the method such as immersion or spraying depending on the apparatus, and carried out in a batch process or a continuous process.

After the water washing process, drying may be performed to remove water, and then the dried spent catalyst may be used in the next step. The drying temperature and period of time are not particularly limited and for example, drying may be carried out from 60 to 120° C. for 30 minutes to 24 hours.

(S5) High Temperature Heat Treatment Process (2nd Roasting)

Next, the water-washed spent catalyst may be recovered and the high temperature heat treatment process may be performed to obtain the regenerated catalyst.

The high temperature heat treatment process may be a process for completely removing carbon and sulfur contained in the spent catalyst, and may be performed at a temperature of from 400 to 600° C., preferably from 450 to 550° C. for 1 to 3 hours. When the heat treatment temperature and period of time are less than the above ranges, it is impossible to effectively remove carbon and sulfur. On the contrary, when the heat treatment temperature and period of time exceed the above ranges, there is a possibility of loss due to coagulation between the active components. Accordingly, the heat treatment temperature and period of time can be appropriately adjusted within the above ranges.

This high-temperature heat treatment process is an oxidation heat treatment process under an oxidizing atmosphere, and may be performed while injecting water vapor ($H_2O$), air, and preferably a gas containing 20 to 50% of water vapor.

The regenerated catalyst according to the present disclosure prepared through the above method has a difference in addition of a low temperature heat treatment process in comparison with the conventional regeneration process of catalysts. This difference affects the composition and mechanical properties of the resulting regenerated catalyst even when using the same spent catalyst, which in turn affects the activity of the regenerated catalyst, i.e. desulfurization performance. The regenerated catalyst has a higher active component content in the catalyst than the regenerated catalysts prepared in the conventional process in terms of composition, has a low content of vanadium oxide and has improved mechanical strength and desulfurization performance in terms of physical properties.

By measuring the content of the active component of the catalyst and vanadium oxide through X-ray fluorescence analysis (XRF), it can estimate the degree of loss of the active component in the regenerated catalyst after the regenerating process and the degree of removal of vanadium. Specifically, the regenerated catalyst according to the present disclosure may contain about 80%, preferably about 90%, more preferably about 95% of the active component of the catalyst as compared to the fresh catalyst and has the content of vanadium oxide of less than 1% by weight based on total weight of the regenerated catalyst, and thus has catalytic activity similar to that of the fresh catalyst.

Also, in the case of the spent catalyst, impurities are deposited on the pores and a specific surface area of BET (Brunauer Emmett Teller) is less than 80 $m^2/g$. However, the regenerated catalyst according to the present disclosure has the BET specific surface area of 140 $m^2/g$ or more and thus has a specific surface area of 98% or more as compared to the fresh catalyst, and can exhibit similar activity to the fresh catalyst.

The active component of the regenerated catalyst is directly related to the desulfurization performance, and thus should have catalytic activity similar to that of the fresh catalyst in order to replace the fresh catalyst, that is, desulfurization performance, and at the same time, should have mechanical strength enough to be applied to the desulfurization process.

Preferably, the regenerated catalyst according to the present disclosure has the desulfurization performance of 98% or more, and the mechanical strength, specifically compressive strength of 97% or more in comparison with the fresh catalyst. Therefore, according to the present disclosure, the spent catalyst is almost recycled to the level of the fresh catalyst and can be reused.

Accordingly, the regenerated catalyst prepared through the regenerating process according to the present disclosure can reduce the environmental burden by reusing the spent catalyst to be disposed or buried.

Hereinafter, the present invention will be described in more detail through examples. These examples are merely illustrative of the invention, and the scope of the invention should not be construed as being limited by these examples.

EXAMPLES

Example 1

The spent catalyst after the heavy oil desulfurization process from the domestic refinery was washed with n-heptane three times to remove the heavy oil from the spent catalyst. Thereafter, the washed spent catalyst was dried at room temperature for 10 hours and dried at 100° C. for 2 hours.

The dried spent catalyst was subjected to the first low temperature heat treatment at 240° C. for 2 hours and then the acid treatment process was performed at 50° C. for 2 hours by using a 15% by weight aqueous solution of oxalic acid at the molar ratio of 1:1 relative to the residual vanadium content in the spent catalyst.

Next, the spent catalyst from the acid treatment process was washed three times with water, dried at room temperature, and subjected to high temperature heat treatment at 450° C. for 2 hours to prepare a regenerated catalyst.

Example 2

A regenerated catalyst was prepared in the same manner as in example 1 except that the low temperature heat treatment was performed at 270° C.

Example 3

A regenerated catalyst was prepared in the same manner as in example 1 except that the low temperature heat treatment was performed at 300° C.

Comparative Example 1

A regenerated catalyst was prepared in the same manner as in example 1 except that the low temperature heat treatment was performed at 330° C.

Comparative Example 2

The spent catalyst after the heavy oil desulfurization process from the domestic refinery was washed with n-heptane three times to remove the heavy oil from the spent catalyst. Thereafter, the washed spent catalyst was dried at room temperature for 10 hours and dried at 100° C. for 2 hours.

The dried spent catalyst was subjected to the heat treatment at 500° C. for 2 hours and then the acid treatment process was performed at 50° C. for 2 hours by using a 15% by weight aqueous solution of oxalic acid at the molar ratio of 1:1 relative to the residual vanadium content in the spent catalyst.

Next, the spent catalyst from the acid treatment process was washed three times with water, and dried at room temperature to prepare a regenerated catalyst.

Experimental Example 1

The compositions of the regenerated catalysts prepared in the above examples and comparative examples were measured using the XRF (X-ray fluorescence analyzer, OLYMPUS, OLYMPUS X). The results obtained were shown in Table 1 below.

TABLE 1

| composition (% by weight) | Control | Example 1 | Example 2 | Example 3 | Comparative Example 1 | Comparative Example 2 |
|---|---|---|---|---|---|---|
| molybdenum | 8.917 | 8.514 | 8.065 | 6.912 | 2.957 | 0.987 |
| nickel | 4.410 | 4.226 | 4.159 | 3.756 | 1.656 | 0.756 |
| vanadium | — | 0.949 | 0.563 | 0.375 | 0.118 | 0.012 |

Referring to Table 1, it can be seen that in the cases of the regenerated catalysts of examples 1 to 3 obtained by performing the low temperature heat treatment process, the residual amount of the active components is very high compared to the regenerated catalysts of comparative examples 1 and 2.

Also, referring to examples 1 to 3, as the temperature of the low temperature heat treatment is increased, the residual amount of molybdenum and nickel as the active components and vanadium as the deposit tends to decrease.

In addition, it can be seen that in the case of the regenerated catalyst of comparative example 2 in which only high temperature heat treatment was performed, the deposited vanadium is almost removed, but the loss of molybdenum and nickel as the active components also largely occurs accordingly.

From these results, it can be seen that in the case of the catalyst regenerated by the present disclosure, the loss of the active component is minimized and the deposited vanadium can be removed as much as possible.

Experimental Example 2

The properties of the regenerated catalyst prepared in the above examples and comparative examples were measured according to the following and the results obtained are shown in Table 2 below.

(1) Compressive Strength

The average value of the vertical force applied per unit length of 10 specimens as measured by using a compressive strength tester (Digitech, AFK-500TE) was expressed by a value relative to 100 of the measurement value of a fresh catalyst.

(2) Desulfurization Performance

The desulfurization performance was measured on the CATATEST UNIT, a fixed-bed high-pressure continuous flow reactor. 0.5 g of preliminarily sulfated catalyst (particle size 80-100 mesh) was placed in the center of the reactor, and then a hydrogenation desulfurization reaction was carried out while injecting a raw material solution of 0.5 mol. % of dibenzothiophene (DBT)/n-heptane under the following conditions:

[Operation conditions of the reactor: temperature (673 K), pressure ($30 \times 10^5$ Pa), contact time (0.02 g cat. hr/ml feed), $H_2$/H.C. molar ratio (40/1)].

The product was analyzed by GC (6890A, Hewlett Packard Co.) and the desulfurization performance was expressed by DBT conversion ratio according to the following equation (1):

DBT conversion rate (%)=(DBT content in reactant− one DBT content in product)/DBT content in reactant×100. [Equation 1]

TABLE 2

| Item | Example 1 | Example 2 | Example 3 | Comparative Example 1 | Comparative Example 2 |
|---|---|---|---|---|---|
| Compressive strength (%) relative to fresh catalyst | 99% | 99% | 97% | 92% | 86% |
| DBT conversion (%) | 98.6% | 100% | 99.2% | 96.4% | 90.4% |

Referring to Table 2, it can be confirmed that the regenerated catalysts of examples 1 to 3 according to the present disclosure have the mechanical strength of 97% or more and a desulfurization performance of 98% or more relative to the fresh catalyst.

In comparison, the regenerated catalyst of comparative example 1 in which the low temperature heat treatment was carried out at a temperature higher than the temperature disclosed in the present disclosure has low compressive strength and desulfurization performance. The regenerated catalyst of the comparative example 2 belonging to the prior art has the compressive strength of 86% and also has significantly lower value of desulfurization performance.

Therefore, it is possible to prepare the regenerated catalyst having improved mechanical strength such as compressive strength and desulfurization performance through the regenerating process according to the present disclosure. And it can be seen that it can be used sufficiently instead of the fresh catalysts.

The regenerated catalyst according to the present disclosure is preferably applied to a petroleum refining process.

What is claimed is:

1. A regenerated catalyst for a heavy oil or residue oil hydrogenation process prepared by regenerating a spent catalyst comprising: an active component supported by a catalyst support,
   wherein the regenerated catalyst has a vanadium oxide content of 1.0% by weight or less, as measured by fluorescent X-ray analysis, and a compressive strength of 97% or more as compared to those of a fresh catalyst and
   wherein the regenerated catalyst is prepared by a method comprising
      a low temperature heat treatment process of first heat-treating a spent catalyst at a low temperature;
      an acid treatment process of treating the low temperature heat-treated spent catalyst with an acid solution; and
      a high temperature heat treatment process of second heat-treating the acid-treated spent catalyst at a high temperature,
   wherein the low temperature heat treatment process of first heat-treating a spent catalyst is conducted at a low temperature of from 220° C. to 300° C.

2. The regenerated catalyst for the heavy oil or residue oil hydrogenation process according to claim 1, wherein the regenerated catalyst has a desulfurization performance of 98% or more as compared to the fresh catalyst.

3. The regenerated catalyst for the heavy oil or residue oil hydrogenation process according to claim 1, wherein the active component is at least one selected from the group consisting of molybdenum, tungsten, cobalt, and nickel; metal oxides thereof and a mixture thereof.

4. The regenerated catalyst for the heavy oil or residue oil hydrogenation process according to claim 1, wherein the catalyst support includes at least one selected from the group consisting of activated carbon, zeolite, $Al_2O_3$, $SiO_2$ and $ZrO_2$.

5. A method of preparing a regenerated catalyst for a heavy oil or residue oil hydrogenation process, which comprises
   a low temperature heat treatment process of first heat-treating a spent catalyst at a low temperature;
   an acid treatment process of treating the low temperature heat-treated spent catalyst with an acid solution; and
   a high temperature heat treatment process of second heat-treating the acid-treated spent catalyst at a high temperature,
   wherein the low temperature heat treatment process is performed at a temperature of from 220° C. to 300° C.

6. The method of preparing the regenerated catalyst according to claim 5, wherein before the low temperature heat treatment process, a solvent washing process of washing the spent catalyst with a solvent is further performed in order to remove heavy or residue oil.

7. The method of preparing the regenerated catalyst according to claim 6, wherein the high temperature heat treatment process is performed at a temperature from 400 to 600° C.

8. The method of preparing the regenerated catalyst according to claim 5, wherein before the high temperature heat treatment process, a water washing process of washing the acid-treated spent catalyst with water is further performed.

9. The method of preparing the regenerated catalyst according to claim 5, wherein the acid treatment solution is an aqueous solution including at least one acid selected from the group consisting of oxalic acid, citric acid, succinic acid, sulfuric acid and nitric acid.

10. The method of preparing the regenerated catalyst according to claim 5, wherein the acid solution is used so that a molar ratio of vanadium deposited in the spent catalyst to acid is from 1:1 to 1:2.

11. The method of preparing the regenerated catalyst according to claim 5, wherein the acid solution has a concentration of from 5 to 25% by weight.

12. The method of preparing the regenerated catalyst according to claim 10, wherein the acid treatment process is performed at a temperature of from 25 to 60° C.

* * * * *